J. W. SIMMONS.
AUTOMOBILE BUMPER.
APPLICATION FILED JAN. 4, 1921.
1,378,906. Patented May 24, 1921.
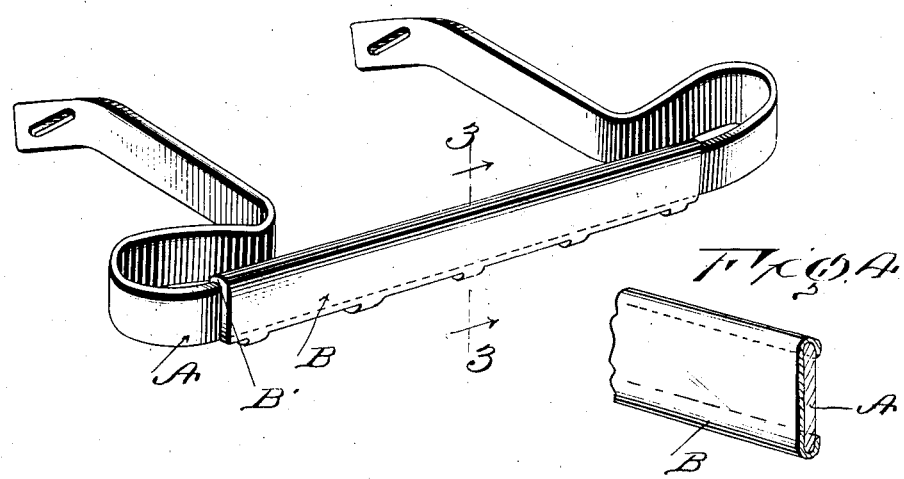
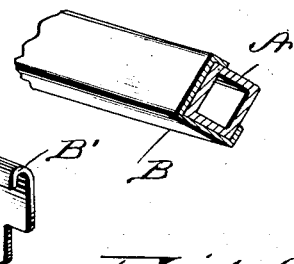
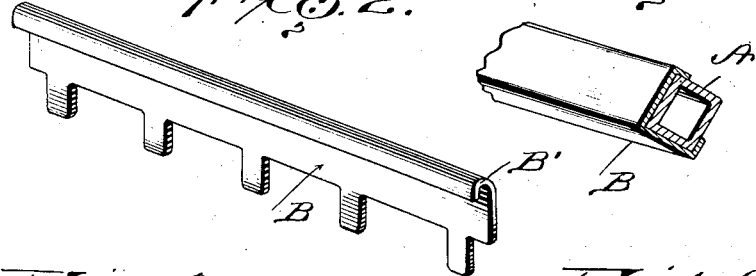
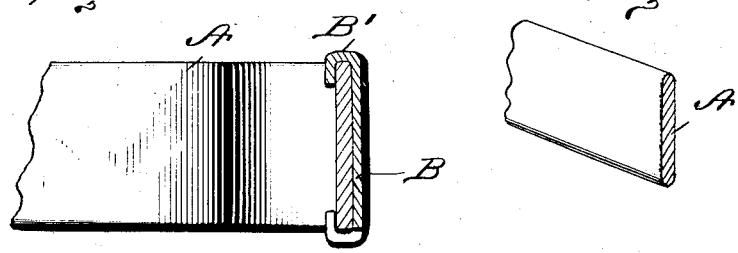
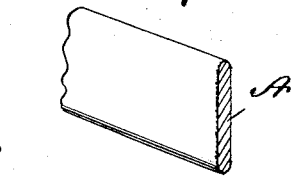
Inventor
J. W. Simmons
By Hull Smith Brock & West
Attorney

UNITED STATES PATENT OFFICE.

JOHN W. SIMMONS, OF CLEVELAND, OHIO.

AUTOMOBILE-BUMPER.

1,378,906.　　　　　Specification of Letters Patent.　　Patented May 24, 1921.

Application filed January 4, 1921. Serial No. 434,882.

*To all whom it may concern:*

Be it known that I, JOHN W. SIMMONS, a citizen of the United States, residing at Cleveland, in the county of Cuyahoga and State of Ohio, have invented certain new and useful Improvements in Automobile-Bumpers, of which the following is a specification, reference being had therein to the accompanying drawing.

This invention relates generally to automobile bumpers and more particularly to a covering for the front member of the bumper proper whereby any desired finish for the bumper can be obtained.

It is well known that automobile bumpers are made of comparatively heavy stock and in some instances are provided with a separate nickel-plated strip in the form of a reinforcing member and in other instances the metal bumper itself is nickel-plated for at least a portion of its length. The manufacturer of bumpers is not always able to judge whether the trade wishes enameled black finished or nickel-plated bumpers and he is therefore required to manufacture a varied assortment which is quite expensive.

The object of the present invention is to provide a thin metallic covering which can be quickly and easily applied to the front member of the bumper proper for the purpose of imparting an ornamental or finished effect to the bumper; and this cover can be of polished metal, nickel plate or enameled as desired.

Another object of the invention is to provide a nickel-plated or enameled cover which can be quickly and easily removed and replaced when desired.

With these objects in view the invention consists in the novel features of construction hereinafter fully described and set forth in the appended claims.

In the drawings forming a part of this specification,

Figure 1 is a perspective view showing the practical application of my invention;

Fig. 2 is a detail perspective view of the cover detached from the bumper; and

Fig. 3 is a sectional view on the line 3—3 of Fig. 1.

Figs. 4, 5 and 6 show slight modifications.

In the drawings A indicates the bumper proper which may be of any desired construction. To the front member of this bumper is applied the thin sheet metal cover B consisting of a strip the desired length and having its upper edge preferably rolled over as shown at B' and its lower edge preferably provided with tongues or teeth capable of being folded around the lower edge of the front member of the bumper in order to securely fasten the cover to said member, the rolled upper edge being fitted upon the upper edge of the bumper as most clearly shown in Fig. 3.

The cover can be nickel-plated or enameled and can be quickly and easily applied inasmuch as the said cover is of thin light metal and the tongues or teeth easily folded around the lower edge of the bumper member. If desired, the entire lower edge could be folded around the bumper member instead of forming the said lower edge with the depending tongues or teeth.

By means of this covering the manufacturer can make all of the bumpers of uniform construction so far as finish is concerned and can immediately furnish to the trade the ordinary black finish or the enameled or nickel-plated finish along the front bar by simply attaching the desired finish of covering to said bar. Furthermore, these covers can be sold independently to the customer who can apply the same quickly and easily when desired and in case one cover should become damaged or impaired in appearance, it can be quickly and easily removed and a new one substituted.

If desired the thin metal cover applied to the front member can be made in sections as well as in a single piece.

Various materials can be employed for making the cover so long as said cover is thinner than the bumper itself and of such degree of thinness to permit the rolling over of the edges for the purpose of quickly and easily attaching the cover to the bumper. The cover may be made of material which takes a polish in which event it would not be necessary to nickel plate or otherwise coat the same. Furthermore a thin sheet of highly polished metal may be applied in any suitable manner to the front member of the bumper and thereby produce substantially the same effect.

It will also be understood that the cover can be applied to a bumper member of the flat vertical type and it can also be applied to a bumper member of the square or diamond shape of bumper.

Having described my invention, what I claim and desire to secure by Letters Patent is:—

1. An automobile bumper having a sheet metal cover applied to the front member thereof to impart a finish thereto.

2. An automobile bumper having a thin sheet metal cover detachably connected to the front member thereof and imparting a finish thereto.

3. The combination with an automobile bumper, of a thin sheet metal cover for the front member thereof, the opposite edges of said cover being folded around the opposite edges of the bumper.

4. The combination with an automobile bumper, of a cover of thin sheet metal for the front member thereof, said cover having a rolled over upper edge and depending tongues along its lower edge for the purpose set forth.

5. A cover for the front member of an automobile bumper consisting of a thin sheet of metal having its upper and lower edges shaped for engagement with the upper and lower edges of said front member whereby said cover can be attached to said front member.

In testimony whereof I hereunto affix my signature.

J. W. SIMMONS.